United States Patent
Huberman et al.

(10) Patent No.: US 11,661,926 B2
(45) Date of Patent: May 30, 2023

(54) SYSTEM FOR OPTIMIZING AND MAINTAINING POWER PLANT PERFORMANCE

(71) Applicant: Ormat Technologies Inc., Reno, NV (US)

(72) Inventors: Rachel Huberman, Mazkeret Batya (IL); Evgeni Bulgakov, Rehovot (IL); Hilel Legmann, Yavne (IL)

(73) Assignee: ORMAT TECHNOLOGIES INC., Reno, NV (US)

( * ) Notice: Subject to any disclaimer, the term of this patent is extended or adjusted under 35 U.S.C. 154(b) by 0 days.

(21) Appl. No.: 17/269,554

(22) PCT Filed: Jun. 27, 2019

(86) PCT No.: PCT/IB2019/055452
§ 371 (c)(1),
(2) Date: Feb. 19, 2021

(87) PCT Pub. No.: WO2020/039274
PCT Pub. Date: Feb. 27, 2020

(65) Prior Publication Data
US 2021/0332806 A1  Oct. 28, 2021

Related U.S. Application Data

(60) Provisional application No. 62/720,443, filed on Aug. 21, 2018.

(51) Int. Cl.
F03G 7/00 (2006.01)
F24T 50/00 (2018.01)
(Continued)

(52) U.S. Cl.
CPC ............. F03G 7/027 (2021.08); F03G 7/028 (2021.08); F03G 7/04 (2013.01); F24T 10/00 (2018.05); F24T 50/00 (2018.05); F24T 2201/00 (2018.05)

(58) Field of Classification Search
CPC ..... F01K 1/16; F01K 1/18; F01K 7/24; F01K 7/345; F24T 2010/56; F24T 50/00;
(Continued)

(56) References Cited

U.S. PATENT DOCUMENTS

| | | | |
|---|---|---|---|
| 2006/0042258 A1* | 3/2006 | Gadde | F01D 17/162 60/772 |
| 2009/0277173 A1* | 11/2009 | Ernst | F01K 23/065 60/616 |

(Continued)

FOREIGN PATENT DOCUMENTS

| | | | | |
|---|---|---|---|---|
| EP | 3065008 A1 | 9/2016 | | |
| RU | 2343368 C1 * | 1/2009 | ............. | F24T 10/30 |
| WO | 2016007849 A1 | 1/2016 | | |

OTHER PUBLICATIONS

International Search Report issued in Application No. PCT/IB2019/055452 dated Oct. 16, 2019, 3 pages.
(Continued)

*Primary Examiner* — Mickey H France
(74) *Attorney, Agent, or Firm* — Cantor Colburn LLP

(57) ABSTRACT

A geothermal power plant related maintenance support system comprises: a thermodynamic calculation module for determining performance of specified geothermal power plant components; a plurality of embedded sensors, each of which is embedded in a different geothermal power plant location and adapted to sense a corresponding real-time geothermal power plant parameter; a plurality of environmental sensors adapted to sense ambient conditions in the (Continued)

vicinity of the geothermal power plant; and a processor in data communication with each of said embedded sensors and environmental sensors.

5 Claims, 6 Drawing Sheets

(51) Int. Cl.
*F24T 10/00* (2018.01)
*F03G 7/04* (2006.01)

(58) Field of Classification Search
CPC ....... F24T 2201/00; F24T 10/00; F03G 4/072; F03G 4/074; F03G 7/028; F03G 7/027; F03G 7/04
USPC .... 60/646, 657, 658, 660–667, 641.2–641.5, 60/641.6
See application file for complete search history.

(56) References Cited

U.S. PATENT DOCUMENTS

| | | |
|---|---|---|
| 2010/0300092 A1 | 12/2010 | Eli et al. |
| 2011/0132571 A1* | 6/2011 | Zhang ................... F02C 1/04 165/45 |
| 2011/0272117 A1 | 11/2011 | Hamstra et al. |
| 2013/0024179 A1* | 1/2013 | Mazzaro ................ F01K 13/02 703/18 |
| 2013/0327497 A1 | 12/2013 | Genung et al. |
| 2015/0012218 A1 | 1/2015 | Selman et al. |
| 2015/0143806 A1 | 5/2015 | Friesth |
| 2015/0300327 A1 | 10/2015 | Sweatman et al. |

OTHER PUBLICATIONS

Written Opinion issued in Application No. PCT/IB2019/055452 dated Oct. 16, 2019, 4 pages.
Extended European Search Report issued in Application No. 19851602.3 dated Feb. 25, 2022, 8 pages.

* cited by examiner

SYSTEM FOR OPTIMIZING AND MAINTAINING POWER PLANT PERFORMANCE

CROSS REFERENCE TO RELATED APPLICATIONS

This application is a US National Stage application of International Application Ser. No. PCT/I132019/055452, filed Jun. 27, 2019, which claims the benefit of U.S. Provisional Application No. 62/720,443, filed Aug. 21, 2018, both of which are incorporated by reference in their entirety herein.

FIELD

The present invention relates to the field of power plant control systems. More particularly, the invention relates to: a system for predicting power plant component malfunction in order to optimize poorer plant performance.

BACKGROUND

Power plant performance is optimized when its availability is maximized with minimum costs. Maintenance operations are carried out to enable continuous plant operation as much as possible. However, power plant components often malfunction at unknown times, leading to system power production level reduction, and even to power outage if the malfunctioning component is of a critical nature.

It, is an object of the present invention to provide a system for predicting power plant component malfunction or even failure.

Other objects and advantages of the in will become apparent as the description proceeds.

SUMMARY

A geothermal power plant related maintenance support system comprises a thermodynamic calculation module for determining performance of specified geothermal power plant components; a plurality of embedded sensors, each of which is embedded in a different geothermal power plant location and adapted to sense a corresponding real-time geothermal power plant parameter; a plurality of environmental sensors adapted to sense ambient conditions in the vicinity of the geothermal power plant; and a processor in data communication with each of said embedded sensors and environmental sensors.

Said processor is configured to generate, for at least one of said geothermal power plant components, ambient-dependent calculated data related to one or more selected value indicators at an inlet and outlet of each of said at least one geothermal power plant components as based on data sensed by said plurality of environmental sensors and on said thermodynamic calculation module; receive, from the embedded sensors associated with each of said at least on geothermal power plant components, real-time sensed data related to said selected value indicators at the inlet and outlet of each of said at least one geothermal power plant component; compare the real-time sensed data with the generated ambient-dependent calculated data; and generate an automated response if a difference between the real-time sensed data and the generated ambient-dependent calculated data is greater than a predetermined threshold, to indicate that a corrective action within the power plant needs to be performed.

As referred to herein, the "geothermal resource conditions" refers to the geothermal resource fluid sensors which are adapted to sense conditions of the geothermal resource fluid_. The geothermal resource-dependent calculated data that is generated is thus a function of the geothermal resource conditions.

As referred to herein, the "ambient conditions" refers to the environmental sensors which are adapted to sense ambient conditions including meteorological conditions. The ambient-dependent calculated data that is generated is thus a function of the ambient conditions.

Also, "determining performance" of a specified geothermal power plant component is defined by comparing real-time sensed data with generated ambient-dependent calculated data. The performance is considered to be "nominal" when the difference between the real-time sensed data and the generated ambient-dependent calculated data is less than the predetermined threshold and to be "anomalous" when the difference between the real-time sensed data and the generated ambient-dependent calculated data is greater than the predetermined threshold.

A "module" may be implemented as a hardware circuit or may be implemented in software for execution by a processor.

A method for initiating a maintenance operation in a geothermal power plant comprises the steps of quantifying performance of a selected power plant component or of the entire power plant during flow of a geothermal resource fluid through a conduit network of the geothermal power plant; and generating an automated recommendation which facilitates initiation of a maintenance operation related to the geothermal power plant if the quantified performance is anomalous.

DETAILED DESCRIPTION

In a geothermal power plant related maintenance support system, an operator of the power plant, or any other person of authority such as an engineer, viewing display equipment in a control room, is warned when one of a plurality predefined components of the power plant is in danger of malfunctioning or even failing. For sake of simplicity, the person viewing display equipment, often in a control room, will be referred to herein as an "operator". Rather than being subjected to false warnings when measured power plant conditions are indicative of a malfunction, the operator is assured of being warned of a realistic, possibility of component failure when the measured power plant conditions are compared with ambient-dependent calculated values.

A binary geothermal power plant is unique in the sense that the geothermal resource is physically introduced to the inlet of the power plant and has specific fluid conditions upon being extracted from a production well, including flow and temperature conditions, which directly influence the performance of the power plant. The calculated values may therefore be a function of the fluid conditions of the geothermal resource fluid introduced to the inlet of the power plant.

Figure 1:
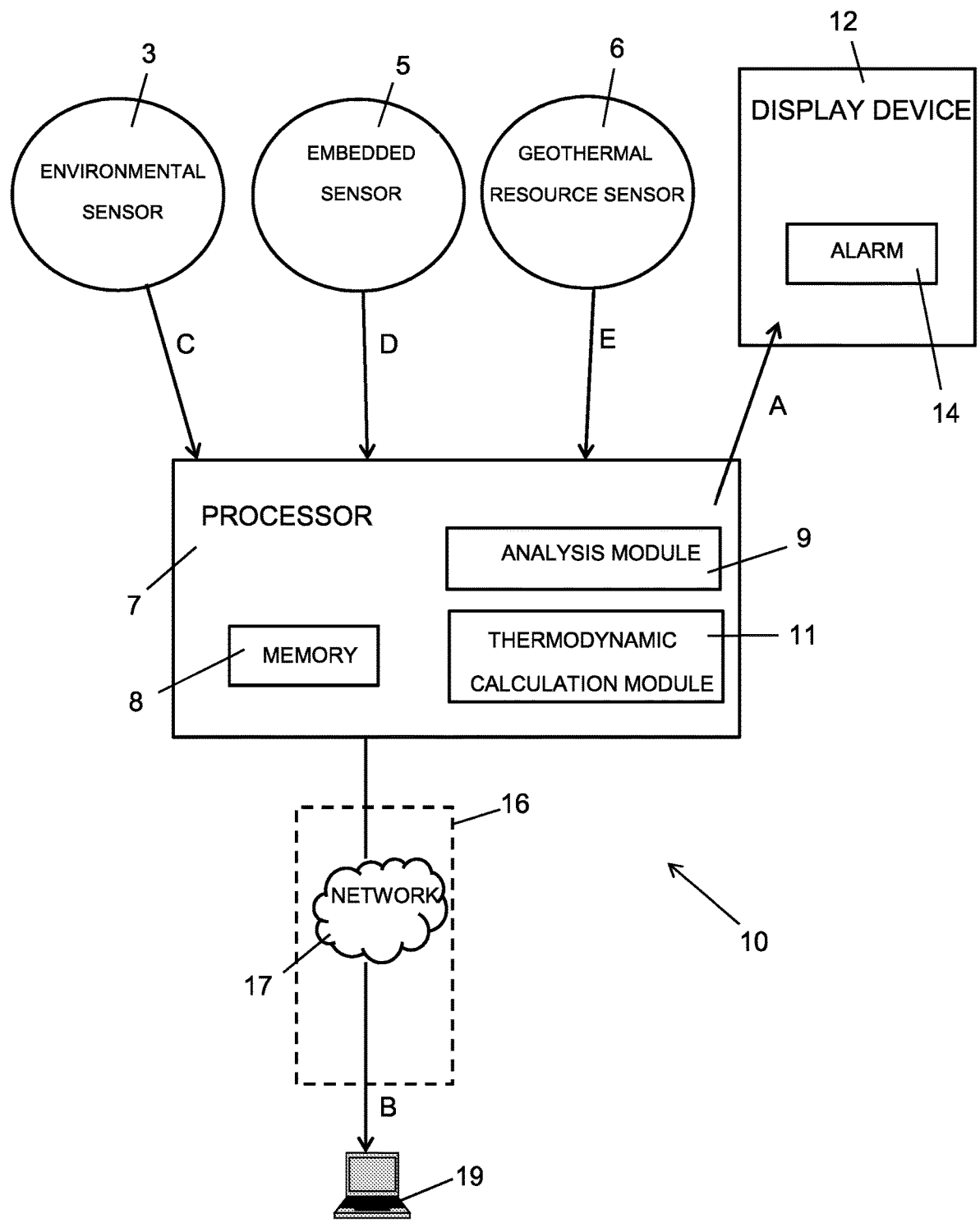
FIG. 1. is a block diagram of an embodiment of a power plant related maintenance support system.

Reference is first made to FIG. 1, which schematically illustrates an embodiment of a geothermal power plant related maintenance support and alarm system, generally indicated by numeral 10 System 10 comprises a plurality of meteorological sensors 3 adapted to sense ambient conditions in the vicinity of the power plant, such as air temperature, an pressure, relative humidity, and wind speed, a plurality of sensors 5, each of which is embedded in a different power plant location and adapted to sense a corresponding real-time power plant parameter, and a plurality of geothermal resource fluid sensors 6 adapted to sense fluid conditions of the geothermal resource fluid at the inlet to the power plant. A processor 7 is in data communication with each of sensors 3, 5 and 6, and is adapted to receive therefrom signals C-E which are indicative of the real-time sensed data related to environmental conditions, a specific power plant parameter and geothermal resource fluid conditions, respectively. Processor 7 comprises at least one memory device 8, such as a buffer, in which is stored ambient-dependent data, geothermal resource-dependent data, such as inlet-dependent calculated data, and component-related power plant data, and. an analysis module 9, which is configured to generate the ambient-dependent data and to compare predetermined sensed data with the generated calculated data.

In some embodiments, the calculated data may be generated based only on meteorological conditions and geothermal resource fluid conditions or only on geothermal resource fluid conditions.

A thermodynamic calculation module 11, which may be configured with an algorithm related to a power plant wide or a system-specific value-related configuration diagram, is provided for determining performance of predetermined power plant components. Thermodynamic calculation module 11 may be embedded in processor 7 as shown, or may be configured independently therefrom.

When analysis module 9 determines that the difference between the predetermined. sensed data and the corresponding generated calculated data is greater than a predetermined threshold, a:xi alarm signal A that is indicative that a specified power plant component s in danger of failure is transmitted from processor 7 to operator-accessible display device 12, generally a human-machine interface (HMI) located in a control room. A distinctive alarm message 14 is displayed on display device 12, to indicate that the alarm message is of a critical nature and that immediate operator intervention is needed in modifying the operation of at least one power plant component Or one or lore devices of the power plant, to avoid failure of the specified power plant component, or, if alarm signal A of a greater severity, to avoid widespread damage to the power plant that will cause a power outage.

Communication module 16 in data communication with processor 7 via data network 17, such as a wide area network (WAN), local area network (LAN), cellular network and Wi-Fi network, may be provided to allow an operator to communicate remotely with the system. Communication module 16 may comprise network adapter, which facilitates remote communication between a computer 19 of the operator, e.g. a smartphone or a PLC, and processor 7 over a weed or wireless network. When a suitable application is installed on computer 19, the images displayed on display device 12 may be duplicated on a screen of computer 19. The application may also enable the operator to retrieve data from processor 7 and to transmit data thereto via signal B.

Alarm message 14 is p preferably differentiated from the normal diagnostic messages that are fed to display device 12, so that it will be quickly noticed by the operator without any cognitive overload.

For example, display device 12 may be normally dark without any diagnostic oi informative information being displayed, so that an alarm message, if displayed, will be quickly handled by the operator. Display device 12 may also be subdivided into a plat plurality of regions, each of which corresponding to a predefined power plant component or system, as further assistance to the operator.

In one embodiment, display device 12 is configured to provide a three-level, hierarchical-based array of information. The information originates at many different areas and components of the power plant at which the values of different parameters, such as temperature, pressure, flow rate, electric current and voltage, are measured. Each level of displayed information may be shown in a different color or shape. A displayed alarm message 14 may flash or an audible sound may go off to warn the operator of the present condition of a given power plant component, until an appropriate action is taken, In the lowest level, an INFORMATION notice may be displayed concerning actions that are taking place or about to take place, for example notifying the operator that certain valves in the power plant will be reconfigured in 15 minutes, such as from a closed configuration to a partially open or completely open configuration. The second level of displayed information is a notice that indicates an anomalous operating condition at a power plant component, for example the temperature of the electric generator has increased to a temperature above its nominal operating level. The third or highest level is a further notice that is indicative of a condition at which a significant risk to a power plant component exists, such as the temperature of the electric generator is at a dangerously high level which can cause damage to the generator itself.

The notice or further notice may constitute the alarm message 14. An explanatory text may be displayed at the same time as the alarm message, to provide assistance to the operator in terms of instructions and proposals as to how the performance of the given power plant component shown to be operating anomalously may be improved.

Furthermore, analysis module 9 can carry out trend analysis by comparing sensor(s) data over a certain period of time adjacent a power plant component(s) in order to uncover a systematic change in the performance of a specific component(s) of the geothermal power plant. Such trend analysis can facilitate optimizing the operation of a certain power plant component(s) as well as providing recommendations for corrective action.

Figure 2:
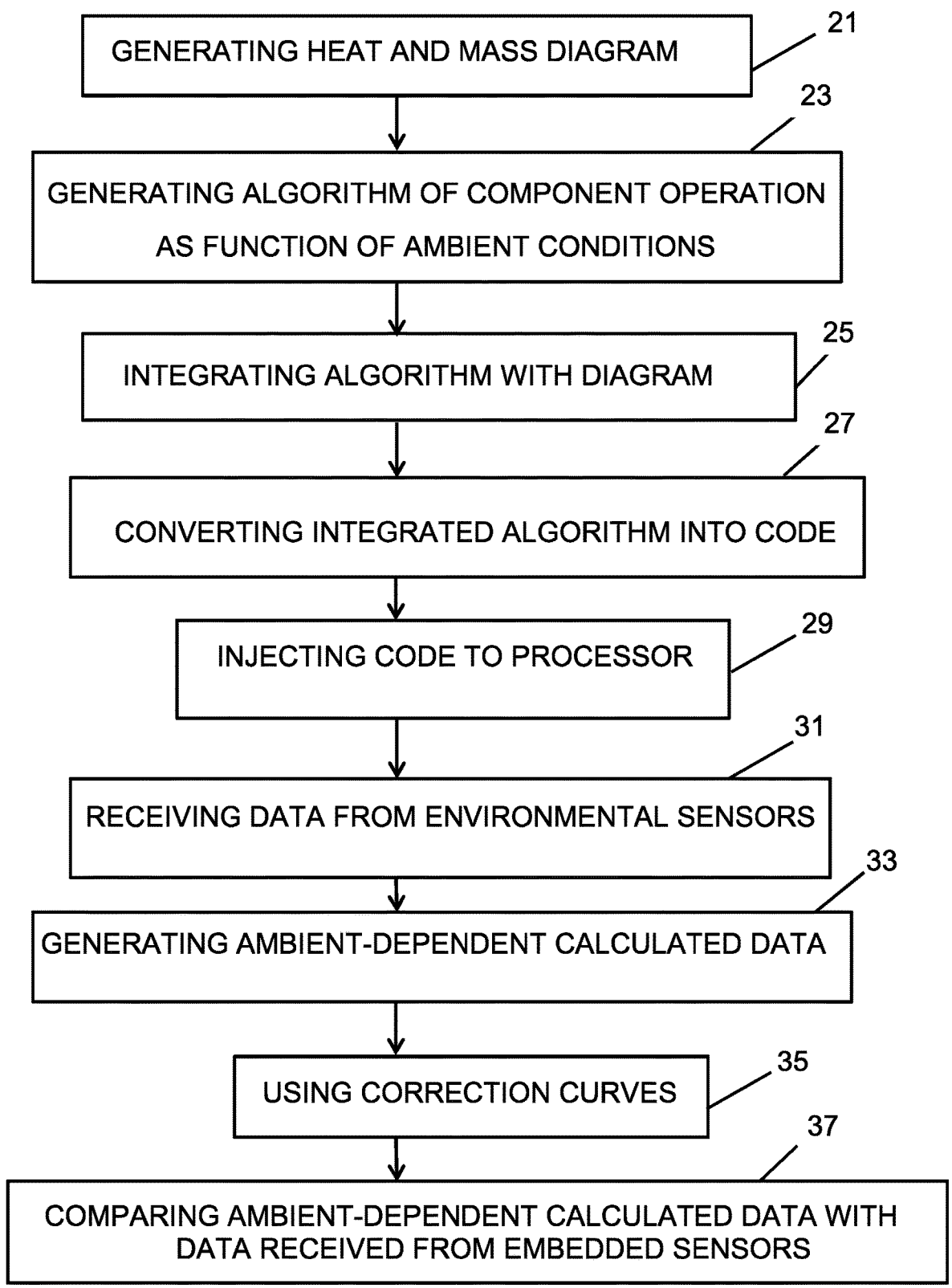
FIG. 2 is a method for generating and utilizing the ambient-dependent calculated data.

FIG. 2 illustrates a method for generating and utilizing the ambient-dependent calculated data. A value-related configuration diagram is generated off-line in step 21 for a selected power plant component. An algorithm representative of the operation of the selected power plant component as a function of ambient, conditions (hereinafter "component conditional operation defining algorithm", or a "CCODA algorithm" in brief) is generated in step 23. The thermodynamic calculation module integrates the algorithm with the value-related configuration diagram in step 25, converts the integrated algorithm to code in step 27, and injects the code into the processor in step 29. The processor, upon subsequently receiving sensed data from the environmental sensors related to the selected power plant component in step 31, generates the ambient-dependent calculated data by means of the code in step 33. The ambient-dependent calculated data is then compared with real-time sensed data received from relevant embedded sensors in step 37 to determine whether a difference greater than a predetermined threshold is identified.

A similar method may be performed for generating and utilizing a CCODA algorithm for calculated data derived from both geothermal resource fluid sensors and meteorological, sensors.

Figure 3:
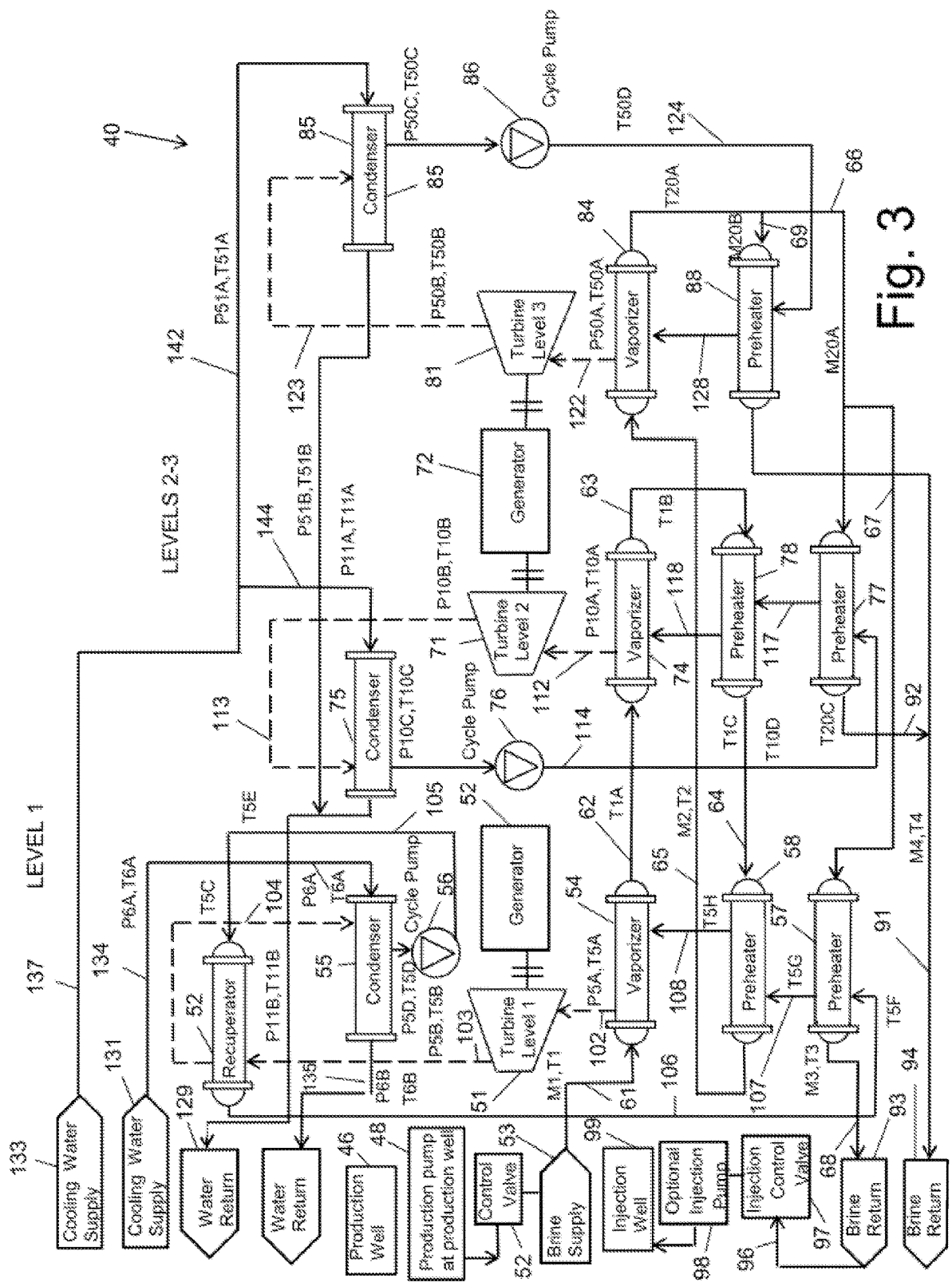
FIG. 3 is a schematic illustration of a typical plant-wide value-related configuration diagram.

An example of a typical plant-wide value-related configuration diagram 40 is schematically illustrated in FIG. 3, Value-related configuration diagram 40 illustrate the components of the geothermal power plant that need to be. monitored and a value indicator representing the inlet or outlet value of the specified component that is to be calculated by ambient-dependent data or sensed by real-time sensed data, so that the calculated data will be compared with the sensed data for every predetermined value indicator. A value indicator is specified at a conduit extending between two components.

The value-related configuration diagram may be integrated with a component-specific CCODA algorithm for every predetermined value indicator. The CCODA algorithm takes into account expected fluid flow conditions and thermodynamic values of both the geothermal resource fluid introduced in to the power plant and of the motive fluid flowing in the power plant as well as the interaction between the geothermal resource fluid and motive fluid at the selected compel. out, in order to generate calculated data.

When a discrepancy is found between calculated data and sensed data for a given value indicator, there may be a doubt as to which component is malfunctioning since the data is generated at a conduit between two components. The processor is able to pinpoint the component that is malfunctioning by determining whether there is a discrepancy at other conduits associated with one of the two components or other sensed values. If a discrepancy is not found at any of these other conduits, then a determination is made that the second component is malfunctioning.

The binary geothermal power plant that is illustrated in value-related configuration diagram 40 has, three independently operating levels for each off, which a motive fluid. flows in a coil closed organic Rankine cycle (ORC), but it will be appreciated that, the configuration diagram may likewise illustrate only one level, or one geothermal power plant system.

Also, the first level is shown to be configured with a recuperator and two preheaters, the second level is shown to be configured with two preheaters and without a recuperator, and the third level is shown to be configured with only one preheater and without a recuperator, hut other geothermal power plant configurations are also within the scope of the invention. Furthermore, the condensers are shown to be of the water cooled type, but it will be appreciated that they also may be of the air-cooled type.

The first-level vaporizer 54 is supplied from inlet port 53 with, geothermal brine with a relatively high enthalpy level that flows via conduit 61, after being pumped from production well 46 by downhole production pump 48 and delivered through wellhead-positioned flow control valve 52, which may be used during periodic maintenance operations and. can be completely closed during emergencies. After vaporizing the motive fluid and producing organic motive fluid vapor which is represented by dashed lines, the brine exits first-level vaporizer 54 via conduit 62 to second-level vaporizer 74. The hey t depleted brine exiting second-level vaporizer 4 flows to the second second-level preheater 8 via conduit 63, and then to the second first-level preheater 58 via conduit; 61 The heat depleted brine then flows sequentially to third-level vaporizer 84 via conduit 65 and to the first second-level preheater 77 via conduit 66 as well as to third-level preheater 88 via branch 69, The flow in conduit 66 branches into conduit 67 that leads to the first first-level preheater 57, train which the exiting brine flows via conduit 68 to first brine outlet port 93. Brine exiting third-level preheater 88 via conduit 91 flows to second brine outlet port 94. The brine exiting first second-level preheater 77 via conduit 92 combines with the brine exiting third-level preheater 88 via conduit 91.

Accordingly, the use of two preheaters in each of the first and second level power plant in conjunction with the utilization of relatively warm brine, or other geothermal liquid, brings about an increase in the thermal efficiency the corresponding power plant.

The brine exiting outlet ports 93 and 94 combine at conduit 96 and flow to wellhead-positioned injection control valve 97, in order to be delivered to injection well 99 optionally by means of injection pump 98.

Vaporized motive fluid flows via conduit 102 from first-level vaporizer 54 to first-level organic turbine 51 in which. it is expanded to produce power and generate electricity by first-level generator 52 coupled with first-level organic turbine 51. The expanded motive fluid, is discharged from first-level organic turbine 51 via conduit 103 to recuperator 51 in order to provide heat influx to the condensate produced by first-level condenser 55. The motive fluid vapor exiting recuperator 51 flows via conduit 104 to first-level condenser 55, and. motive fluid condensate produced therein is supplied by first-level cycle pump 56 to recuperator 51 via conduit 105. The heated condensate exiting recuperator 51 flows via conduit 106 to first first-level preheater 57, and then sequentially to second first-level preheater 58 via, conduit 107 and to first-level vaporizer 54 via conduit 108.

Vaporized motive fluid flows via conduit 112 from second level vaporizer 74 to second-level organic turbine 71, in which it is expanded to produce power and generate electricity by second-level generator 72 coupled with second-level organic turbine 71. The expanded motive fluid is discharged from second-level organic turbine 71 via conduit 113 to second-level condenser 75, and motive fluid condensate produced therein is supplied by, second-level cycle pump 76 to first second-level preheater 77 via conduit 114, and then sequentially to second second-level preheater 78 via conduit 117 and to second-level vaporizer 74 via conduit 118.

Vaporized motive fluid flows via conduit 122 from third-level vaporizer $4 to third-level organic turbine 81, in which it is expanded to produce power and generate electricity using generator 72 also advantageously coupled to third-level organic turbine 81. The expanded motive fluid is discharged from third-level organic turbine 81 via conduit 123 to third-level condenser 85, from which motive fluid condensate produced therein is supplied by third-level cycle pump 86 to third-level preheater 88 via conduit 124, and then to third-level vaporizer 84 via conduit 128.

Cooling water flows via conduit 134 from first cooling water supply port 131 to first-level condenser 55, from which the heated water exits via conduit 135 to first cooling water return port 132.

Cooling water flows via conduit 137 from second cooling water supply port 133, and branches into conduit 142 that extends to third-level condenser 85, and into conduit 144 that extends to second-level condenser 75, from which the heated water exits via conduit 146 to second cooling water return port 139. Heated water exiting third-level condenser 85 via conduit 147 combines with conduit 146.

The following is a non-exhaustive list of value indicators that are superimposed on the first level portion of configuration diagram 40 being indicative for example of a mass flow rate value (M), a temperature value (T) and a pressure value (P) with one or more numerical or sign indicators appearing before er after the value type:

1. M1, T1 located along conduit 61, at the geothermal resource fluid inlet to the geothermal power plant;
2. T1A located along conduit 62 for heat-depleted geothermal brine, near the outlet of vaporizer 54 of Level 1;
3. T1C located along conduit 64 for heat-depleted geothermal brine, near the outlet of pre-heater 78 of Level 2 and inlet of pre-heater 58 of Level 1;
4. M2, T2 located along conduit 65 for heat-depleted geothermal brine, at the outlet of pre-heater 58 of Level 1;
5. M3, T3 located along conduit 68 for heat-depleted geothermal brine, at the outlet of pre-heater 57 of Level 1;
6. M4, T4 located along conduit 91 for heat-depleted geothermal brine, at the outlet of pre-heater 88 of Level 3;
7. P5A, T5A located along conduit 102 for organ c motive fluid vapor, at the inlet to organic turbine 51 of Level 1;
8. P5B, TSB located along conduit 103 for organic motive fluid vapor, at the outlet to organic turbine 51 of Level 1;
9. TSC located along conduit 104 for organic motive fluid vapor, at the inlet to condenser 55 of Level 1;
10. P5D, T5D located along conduit 105 for organic motive fluid condensate, at the outlet of condense 55 of Level 1;
11. T5E located along conduit 105 for organ motive fluid condensate, at the inlet to recuperator 52 of Level 1;
12. T5F located along conduit 1N for organic motive fluid liquid, at. the islet to pre-heater 57 of Level 1;
13. T5G located along conduit 107 for organic motive fluid, liquid, at the inlet to pre-heater 58 of Level 1;
14. T5H located along conduit 108 for organic motive fluid liquid, at the inlet to vaporizer 54 of Level 1;
15. P6A, T6A located along conduit 134 for cooling liquid, at the inlet to condenser 55 of Level 1; and P6B, T613 located along conduit 135 for heat depleted cooling liquid, at the outlet to condenser 55 of Level 1.

Similar value indicators are superimposed on the second and third level portions of configuration diagram 40.

For example, in the Ormesa geothermal plant, California, USA, the geothermal resource fluid sensors sense a temperature of 311.9° F. for value indicator T1 and a flow rate of 3,138,100 lb/hr for value indicator M1 at the power plant inlet. Cooling water sensors sense a water temperature of 69.5° F. and a cooling water flow rate of 28,000 gal/hr at the inlet to the water-cooled condensers.

An embedded sensor is embedded at a different geothermal power plant location corresponding to other value indicators, and the real-time data sensed by an embedded sensor is compared with the ambient-dependent calculated data and/or geothermal resource-dependent calculated data associated with these other value indicators, in order to determine whether an alarm-worthy discrepancy indicative of a malfunction exists at a selected component. The calculated data is generated by means of a component-specific thermodynamic calculation module, after the latter is input with real time data sensed by a meteorological sensor or a geothermal resource fluid sensor. The calculated data is output from the component-specific thermodynamic calculation in module in response to an anticipated reaction of the selected component to an input condition. The input conditions are related to conditions of media that interact with a geothermal power plant component such that if varied will influence the thermal efficiency of the power plant. Examples of media that influence the thermal efficiency of the geothermal power plant include the geothermal resource fluid and wind that interacts with an air-cooled condenser or cooling water that interacts with a water-cooled condenser.

The thermodynamic calculation module specifies for which components of the geothermal power plant is made a determination of whether an alarm-worthy discrepancy exists. The geothermal power plant components for which a determination is made of whether an alarm-worthy discrepancy exists typically include organic motive fluid turbines, vaporizers, preheaters, recuperators, condensers and cycle pumps. The thermodynamic calculation module thus automatically generates calculated data for each value indicator at the inlet and outlet of the specified component or components, whether continuously, periodically, or intermittently, and then compares the calculated data for each value indicator with corresponding real-time, sensed data related to the same value indicator inn order to determine whether a discrepancy exists and to provide an indication as to the performance of the specified component or components.

A geothermal power plant parameter that is significantly relied upon by the CCODA algorithm is the temperature parameter, which is sensed by an embedded sensor, although other power plant parameters are relied upon as well.

For example, the T2 and T1C value indicators in the temperature at the outlet and inlet, respectively of preheater 58. If the measured temperature at the outlet of the preheater is less than the calculated value, there may be an indication that precipitants from the brine may have precipitated out of the geothermal resource fluid or liquid and have formed a layer on the inner surface of the tubes in the shell and tube preheater. A WARNING notice indicative of the need to perform a maintenance operation may be displayed on the operator-accessible display device if there is a discrepancy between the measured temperature at the T2 value indicator, or at, another value indicator, and the calculated value of mere than 7° F. If, however, there is a discrepancy between the measured temperature rate at the T2 value indicator, or at: another value indicator, and the corresponding calculated value of more than 15° F., a DANGER notice is displayed on the operator-accessible display device to indicate to the operator that a significant risk to a power plant component exists and that the component at risk must be immediately dealt with or even be deactivated.

The M2 value indicator may be relied upon to calculate the instantaneous heat transfer coefficient or the imposed heat load for preheater 58 in conjunction with the thermodynamic calculation module, as the mass flow rate greatly influences heat transfer. A notice indicative of the need to perform a maintenance operation may be displayed on the operator-accessible display device if there is a discrepancy between the measured flow rate at the M2 value indicator, or at another value indicator, and the corresponding calculated value of at least 10%. If, however, there is a discrepancy between the measured flow rate at the M2 value indicator, of at another value indicator, and the corresponding calculated value of at least 20%, a further notice is displayed on the operator-accessible display device to indicate to the operator that a significant risk to a power plant component exists and that the component at risk must be immediately be dealt with or even deactivated. For example, such a further notice may be indicative that cycle pump 56 should be immediately dealt with or even deactivated.

At times, a discrepancy exists at all components, for example when a cycle pump supplying motive fluid condensate malfunctions to cause a change in the mass flow rate of the motive fluid, Another discrepancy that exists at all, or at a majority of components, occurs when there is a step loss in the brine temperature, as measured at the temperature value indicators at a conduit through which brine flows, T1, at the inlet to the geothermal power plant (or the inlet of Level I of geothermal power plant) indicating that e.g. a hole developed at the casing of production well 46. Such malfunctions certainly influence the thermal efficiency of the power plant, and an alarm will issue after the processor receives an indication that all, or at least a majority of the components of the power plant, reflect a discrepancy.

A flow rate value indicator at an above-ground geothermal plant location may also be indicative of the malfunction of a downhole component. For example, a measured flow rate at value indicator M1 at the inlet to the geothermal power plant (or the inlet of Level. I of geothermal power plant), which is slowly decreasing may be indicative of e.g. a hole at the pump column of production pump 18. Alternatively, a constant cooling of the brine temperature at value indicator T1, or a constant difference in temperature at value indicators T1 and T3, which is less than a nominal value, may be indicative of a breakthrough of brine from the injection well and that injected geothermal brine or liquid is seeping into the production well zone and causes cooling. Furthermore, a slow decrease in the flow rate of the geothermal brine measured by M1 at the inlet to the geothermal power plant (or the inlet of Level I of geothermal power plant) may also indicate erosion of the down-well pump taking place or scale build-up occurring in the down-well pump.

Another geothermal power plant parameter that is significantly relied upon by the CCODA algorithm is the pressure parameter, in addition to the temperature. parameter, The power output of organic turbine 51 may be calculated, predicted and/or measured based on data derived at both the turbine inlet and outlet, i.e. value indicators P5A, T5A, P513 and T5B, in conjunction with the thermodynamic calculation module. If the pressure at value indicator PSA is excessively low, there may be an indication that control valve 52 or cycle pump 56 is malfunctioning.

The analysis module (FIG. 1) is able to automatically measure and calculate on-dine the various power plant parameters specified by the CCODA algorithm and in accordance with input information. Parameters such as power plant output, component performance and pinch restriction, or the temperature difference between the brine which is being cooled and the organic motive fluid at its vaporization temperature, are indicative of the thermal efficiency of the geothermal power plant. The pinch restriction, for example, is, indicative of the temperature of the brine return, which has an influence on the thermal efficiency of the geothermal power plant. By being able to automatically measure, calculate and compare data, the analysis module is not only able to quantify a component's performance, but it is also able to predict when the specified component is in need of maintenance due to e.g, a steady decline in performance to a predetermined low level or predetermined threshold.

Figure 4:
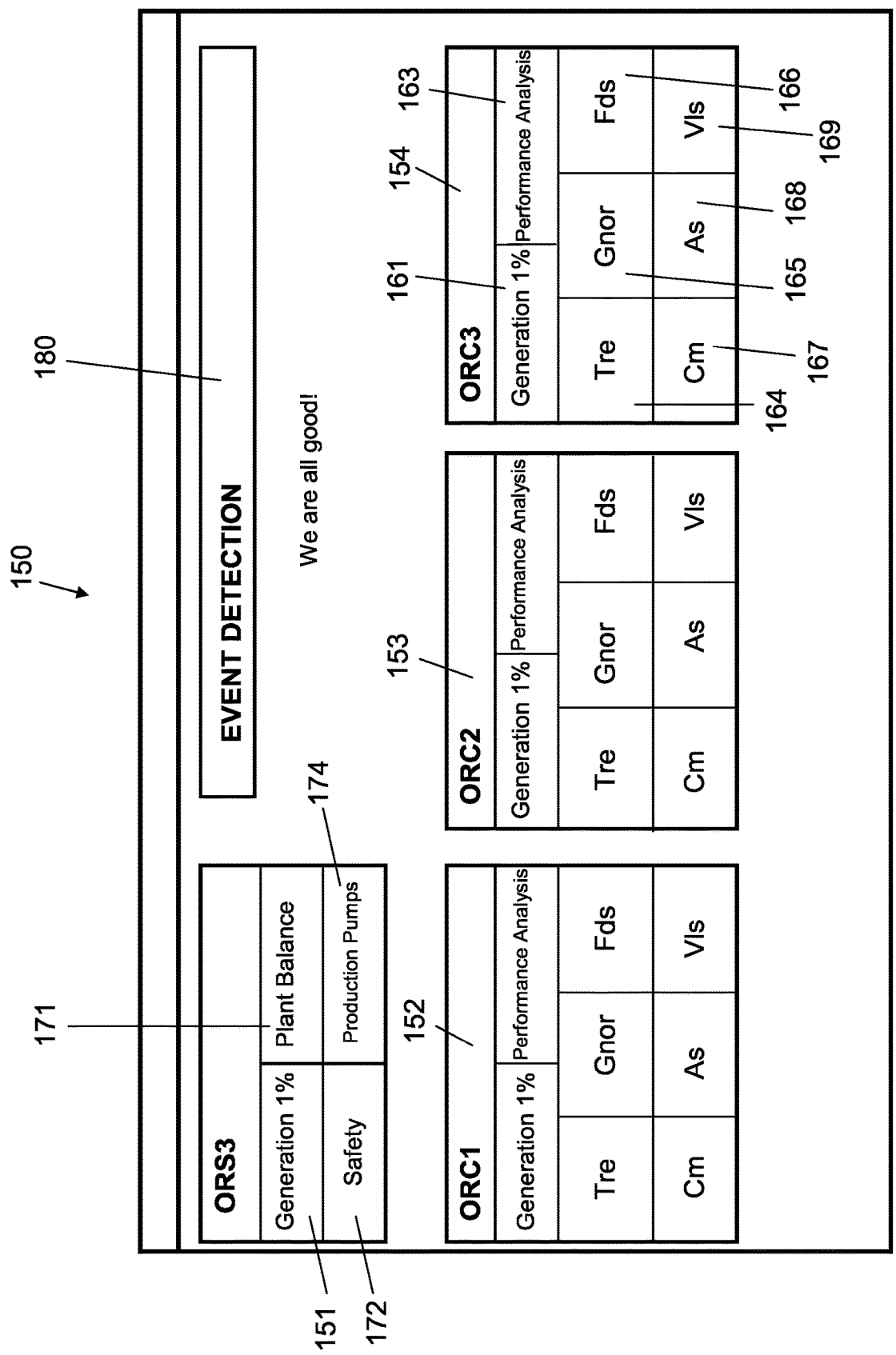
FIG. 4 is a schematic illustration of a displayed performance analysis

A. typical plant-wide performance analysis carried out by the analysis module, as displayed on a display device 151, is illustrated in FIG. 4.

Three main display regions 152-154 are shown, one for each of the different power levels of the geothermal power plant [e.g. Level 1 (ORC 1), Level 2 (ORC 2) and Level 3 (ORC 3) of the geothermal power plant]. In each display region, the following data is listed: (1) gross measured power (Generation) 161 as derived from the measured electric power measured at the output of the electric generator coupled to the Organic vapor turbine also showing the gross calculated) power, based on data sensed at the inlet and outlet of the organic vapor turbine, as a percentage of the measured power output. In each display region 152, 153 and 154, an indication 163 is provided showing a value based on the embedded sensors and currently calculated values of the performance analysis of the power plant including its heat exchanger components, e,g. vaporizers, preheaters and recuperators, if included. Furthermore, each display region includes indicators providing information as to operation of the turbine (Tire), 164, the electric generator (Gnor), 165, the feed. (or cycle) pump(s) (Fds) 166, the cooling medium (Cm) 1167, for air-cooled condensers or water cooled condensers, the air system (As), 168 used to operate e.g. pneumatic valves; and the valves (Vls), 169 indicating the status of the valves operating in the specific power plant level, In addition, indicator 171, shows the status of equipment of the balance of the power plant, while indicator 172 shows an indication as to the safety level of components of the power plant. Indicator 174 shows the status of the geothermal production pumps. A further indicator 180 show any event that has occurred in the power plant and its components.

As far as the operation of these indicators are concerned, if one of the indicators turns green (i.e. green color), this indicates that the function of component(s) to which it relates is operating within the defined range of operation. On the other hand, if one of the indicators turns red (i.e. red color), this indicates that the function of component(s) to which it relates is operating outside or reasonably close to extremities of the defined range of operation, indicating that maintenance action should be performed shortly.

Figure 5:
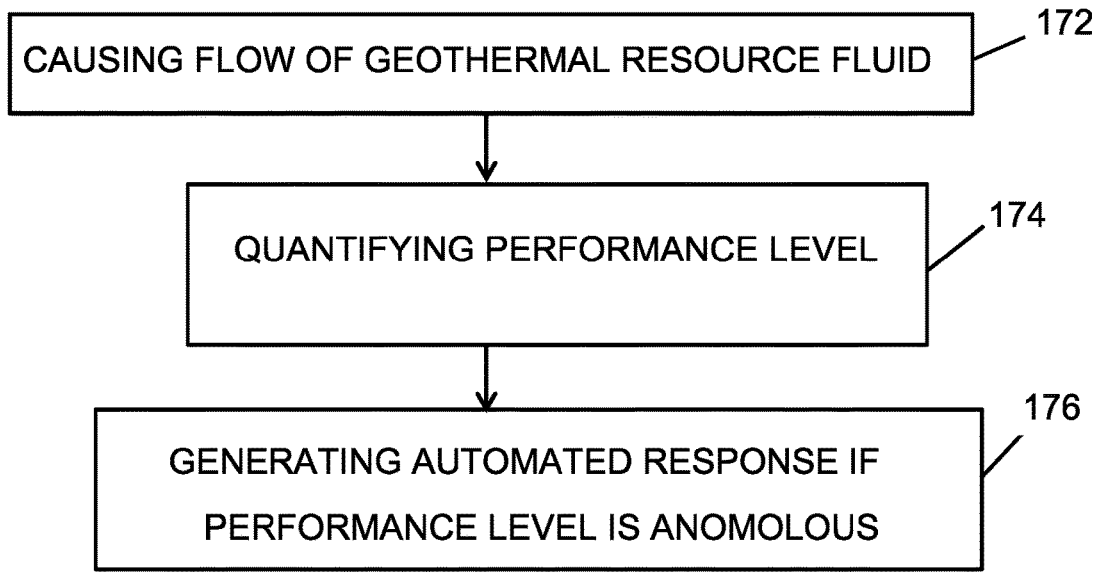
FIG. 5 is a method for initiating a maintenance operation.

As described above, the system of the present invention allows an operator to acquire generated data and displayed information from the processor at a remote location. With this capability, the operator is able to advantageously initiate a needed maintenance operation from the remote location since anomalous component-specific or plant-wide performance is able to be objectively determined FIG. 5 illustrates a method for initiating a maintenance operation. After geothermal resource fluid is caused to flow through a conduit network of a geothermal power plant in step 172 to produce power, such as by being brought in heat exchanger relation with a motive fluid, performance of a power plant component or of the entire power plant is quantified in step 174, such as by determining the difference between real-time sensed data and generated ambient-dependent calculated data. If the performance is found to be anomalous, an automated response facilitating initiation of a maintenance operation is generated in step 176.

Figure 6:
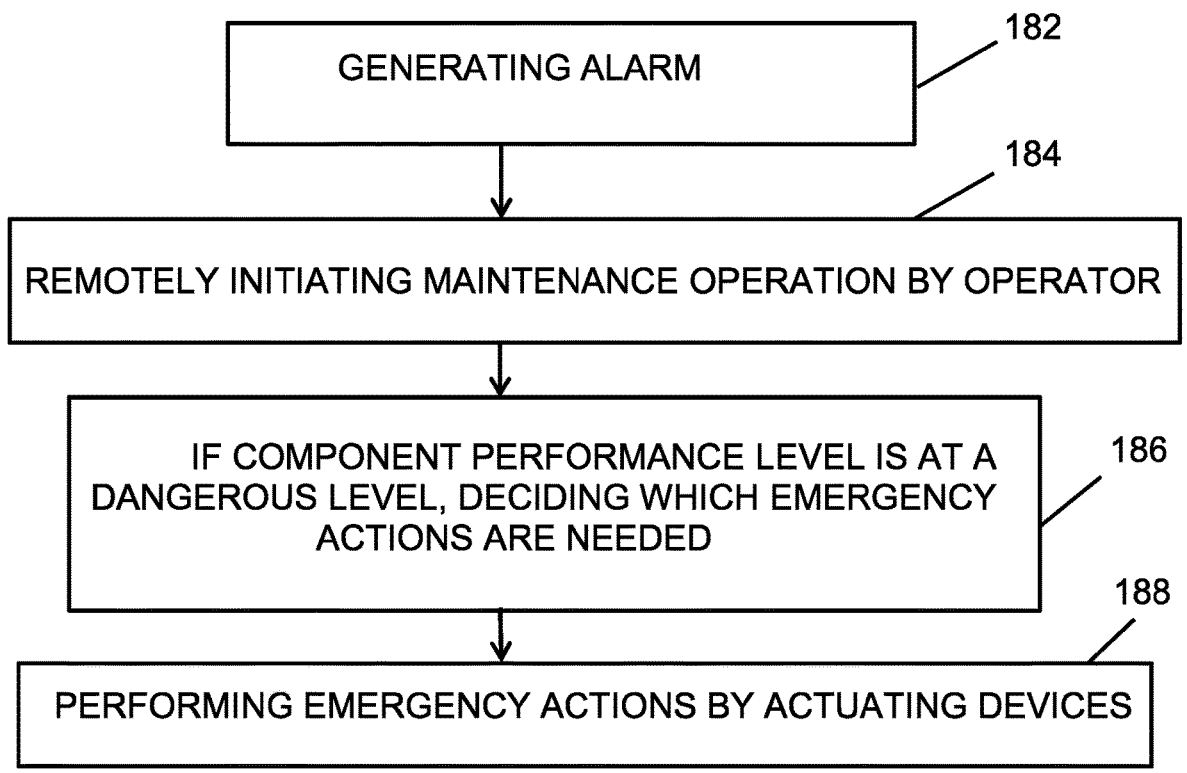
FIG. 6 is method for performing an operator-initiated remote operation.

In one embodiment as illustrated in FIG. 6, the automated response is an alarm such as in the form of a visual or audible indicator that is generated in step 182 when the difference between the real-time sensed data and the generated ambient-dependent calculated data is greater than a first predetermined threshold. In response to generation of the alarm, which may be received by the operator at the remote location, the operator using the operator-accessed computer 19 (FIG. 1) commands initiation of a specified maintenance operation in step 184, preferably in conjunction with a specified component, to be performed by available personnel, in order to enhance plant performance. Of course, the operator may personally perform the maintenance operation if so desired. A maintenance operation is usually related to an anomalous occurrence since preventive maintenance operations are scheduled to take place on a regular basis. At times, the performance level is found to be at a lower dangerous level, i.e, the difference between the real-time sensed data and the generated ambient-dependent calculated data is greater than a second predetermined threshold greater than the first threshold. In such a situation, a significant risk to a power plant component exists and the operator has to rely on his judgment and troubleshooting experience to decide in step 186 which emergency actions are needed to prevent damage, such as shutting down a pump or even lowering plant output. These actions may be commanded remotely by computer 19, or may even be performed remotely in step 188 by means of remotely accessible actuators of devices that are linked to processor 7, with the latter being additionally linked to computer 19 (see FIG. 1).

Figure 7:
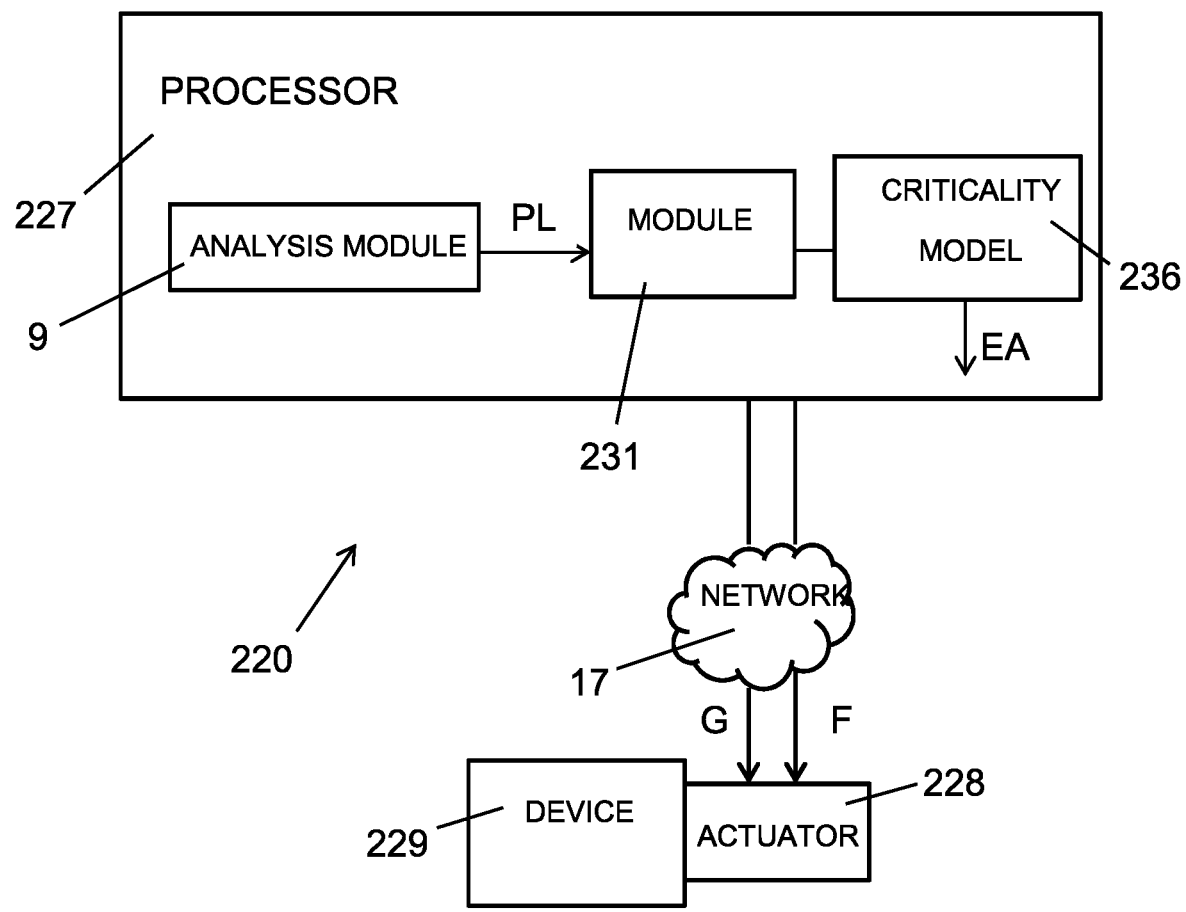
FIG. 7 is a block diagram of another embodiment of a power plant related maintenance support system.

In another embodiment, artificial intelligence or machine learning methods can be used for presenting data showing when emergency actions are or may be needed to prevent damage. Processor 7 then can actuate the relevant signals in order to facilitate a decision as to the appropriate action or response to be carried out As schematically illustrated in FIG. 7, processor 227 of system 220 can comprise module 231, which is fed with the performance level (PL) of the one or more specified power plant components output from analysis module 9, as described hereinabove. Module 231, which is generally but not necessarily based on machine learning techniques such as artificial neural networks involving a training phase, verification phase and monitoring phase, may generate a criticality model 236 based on various geothermal power plant scenarios involving one or more selected components, The criticality model is adapted to output, data related to one of a plurality of stored. emergency actions (EAs) involving the one or more selected components, which are interrelated, when input with a predetermined PI, range. Depending on the outputted data, processor 227 will immediately transmit a signal F to an actuator 228 of a device 229, possibly over data network 17, in order to automatically perform. the EA.

System 220 may also comprise the apparatus illustrated in FIG. 1.

In addition to being instrumental in performing an emergency action, module 231. may also be used as a performance optimizing tool or as a predictive tool, When operating in an optimizing mode, which may be selected or be operable simultaneously with an emergency mode during which an automated response is able to be generated, processor 227 in conjunction with module 231 may transmit a signal G to actuator 228 to perform an optimizing correction of the performance of device 229, or transmit a plurality of corresponding signals G to more than one identical or different actuators 228, if a sequence of the input PL indicative of an imminent tendency of a component to operate under non-optimal conditions, even if the current performance level is nominal. Operation in the optimizing mode permits optimization of various geothermal power plant components, so that, the entire power plant will operate optimally under the current actual conditions.

Module 231 may also be used as a predictive tool when the analysis module retrieves data therefrom, providing insights to the operator into power plant processes by notifying how to optimize the performance of a component and what to do when preventive actions such as maintenance operations are needed. The power output of the organic vapor turbine may be predicted from the power output of the coupled electric generator. Other values of the geothermal power plant components may be predicted as well.

While the description herein refers to a geothermal power plant and its components and operation, the present invention is also applicable for use in a power plant other than a geothermal power plant such as an industrial waste heat power plant e.g. a power plant used to extract heat and produce power from the exhaust gases of a gas turbine power unit operating to provide power to the compressor of a natural gas pipeline.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A method for pinpointing a component of a power plant that is need of maintenance, comprising the steps of:
    a) providing a power plant through a conduit circuit of which motive fluid flows so as to be in heat exchanger relation with a heated source fluid at each of a plurality of power plant components, wherein said conduit circuit comprises a plurality of conduits arranged such that a first conduit extends from an outlet of a first component to an inlet of a second component and a second conduit extends from an outlet of the second component to an inlet of a third component;
    b) deploying a plurality of embedded sensors and environmental sensors, each of said embedded sensors being embedded in a different power plant location and adapted to sense a corresponding real-time power plant parameter and each of said environmental sensors adapted to sense ambient conditions in the vicinity of the power plant;
    c) integrating a thermodynamic calculation module configured with an algorithm representative of operation of each of specified components of the power plant with a power plant wide or a system-specific value-related configuration diagram;
    d) for the first component, comparing real-time sensed data received from associated embedded sensors deployed at its outlet with generated ambient-dependent calculated data related to one or more selected value indicators provided with said configuration diagram at the outlet of the first component based on data sensed by corresponding environmental sensors and on said thermodynamic calculation module;
    e) if a difference between the real-time sensed data and the generated ambient-dependent calculated data at the outlet of the first component is greater than a predetermined threshold for a given value indicator and there is a doubt as to whether the first component or the second component is malfunctioning since both the first and second components are connected to the first conduit which is in fluid communication with the outlet of the first component, repeating step d for the inlet and outlet of the second component; and
    f) if a difference between the real-time sensed data and the generated ambient-dependent calculated data at the inlet and outlet of the second component is less than another predetermined threshold for a given value indicator, it is determined that the first component is malfunctioning and the second component is not malfunctioning.

2. The method according to claim 1, wherein a maintenance operation in the power plant is initiated by performing the steps of quantifying performance of a selected power plant component or of an entire power plant during flow of source fluid through the conduit circuit of the power plant; and generating an automated response which facilitates initiation of the maintenance operation related to the power plant if the quantified performance is anomalous.

3. The method according to claim 2, wherein the performance is quantified by
   a) sensing ambient conditions in the vicinity of the power plant with use of one or more of the environmental sensors;
   b) generating, for the selected component, ambient-dependent calculated data related to one or more selected value indicators at the inlet and outlet of the selected component based on data sensed by said one or more environmental sensors and on data calculated by the thermodynamic calculation module;
   c) receiving, from the embedded sensors associated with the selected component, real-time sensed data related to said one or more selected value indicators at the inlet and outlet of the selected component; and
   d) determining a difference between the real-time sensed data and the generated ambient-dependent calculated data, a quantified performance level being dependent on the difference between the real-time sensed data and the generated ambient-dependent calculated data.

4. The method according to claim 2, wherein the generated automated response is indicative of a severity level of the anomalous performance.

5. The method according to claim 1, wherein the power plant is a geothermal power plant which comprises a closed Organic Rankle Cycle power plant module through the conduit circuit of which the motive fluid flows so as to be in heat exchanger relation with a geothermal resource fluid at each of a plurality of geothermal power plant components.

* * * * *